(12) United States Patent
Ring et al.

(10) Patent No.: US 6,848,754 B2
(45) Date of Patent: Feb. 1, 2005

(54) AUTOMATIC APPLICATION HAND BRAKE

(75) Inventors: Michael E. Ring, Crown Point, IN (US); Scott L. Natschke, Kankakee, IL (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/507,227

(22) Filed: Feb. 18, 2000

(65) Prior Publication Data

US 2003/0075399 A1 Apr. 24, 2003

(51) Int. Cl.$^7$ .............................................. B60T 13/22
(52) U.S. Cl. ........................ 303/71; 188/33; 188/107; 188/153 R; 188/3 H
(58) Field of Search ..................... 188/33, 107, 153 R, 188/72.1, 73.1, 3 R, 3 H; 303/18, 9.61, 2, 3, 71

(56) References Cited

U.S. PATENT DOCUMENTS

| | | | | |
|---|---|---|---|---|
| 2,940,554 A | * | 6/1960 | Cameron ................. | 188/153 R |
| 3,782,785 A | * | 1/1974 | Budzich ................... | 303/21 F |
| 3,891,277 A | * | 6/1975 | Cope ............................. | 303/2 |
| 3,937,295 A | * | 2/1976 | Wright ....................... | 180/271 |
| 3,954,304 A | * | 5/1976 | Engle ........................... | 303/13 |
| 4,296,707 A | * | 10/1981 | Kennedy .................. | 116/58 A |
| 4,368,927 A | * | 1/1983 | Billingsley et al. ........... | 303/18 |
| 4,368,928 A | * | 1/1983 | Billingsley et al. ........... | 303/18 |
| 4,525,011 A | * | 6/1985 | Wilson ........................ | 303/19 |
| 4,934,214 A | * | 6/1990 | Otte ............................. | 60/484 |
| 4,978,178 A | * | 12/1990 | Engle .......................... | 303/13 |
| 5,201,890 A | * | 4/1993 | Sauer et al. ................. | 188/107 |
| 5,291,764 A | * | 3/1994 | Chang ......................... | 188/265 |
| 5,549,363 A | * | 8/1996 | Kanjo et al. ................... | 303/7 |
| 5,566,795 A | * | 10/1996 | Barefoot ..................... | 188/294 |
| 5,586,812 A | * | 12/1996 | Kanjo et al. ................... | 303/7 |
| 5,794,739 A | * | 8/1998 | Ring et al. .............. | 188/153 R |
| 5,813,731 A | * | 9/1998 | Newman, II et al. ......... | 303/89 |
| 6,170,619 B1 | * | 1/2001 | Sheriff et al. ............... | 188/107 |
| 6,186,602 B1 | * | 2/2001 | Jonner et al. ............ | 303/115.4 |
| 6,364,069 B1 | * | 4/2002 | Ring ..................... | 188/1.11 R |
| 6,394,559 B1 | * | 5/2002 | Ring et al. .................. | 188/107 |

FOREIGN PATENT DOCUMENTS

WO    WO-9828174 A1 * 7/1998

* cited by examiner

*Primary Examiner*—Robert A. Siconolf
*Assistant Examiner*—Devon Kramer
(74) *Attorney, Agent, or Firm*—James Ray & Associates

(57) ABSTRACT

An apparatus engageable with a hand brake assembly for automatically applying at least one brake device secured to a railway vehicle with such hand brake assembly. The apparatus includes an operating mechanism having at least a portion thereof engageable with at least one gear of a gear assembly disposed in a housing member of the hand brake assembly for operating such gear assembly in a direction which will cause an application of such brake device. A source of fluid pressure is connected to the operating mechanism for periodically supplying a predetermined pressure to such operating mechanism for the application of the brake device. An activating device is connected to the source of fluid pressure for initiating the supply of such predetermined pressure to the operating mechanism thereby causing an automatic application of such brake device by the hand brake assembly.

16 Claims, 11 Drawing Sheets

AUTOMATIC APPLICATION HAND BRAKE

FIELD OF THE INVENTION

The present invention relates, in general, to hand brake assemblies for use on railway type vehicles and, more particularly, this invention relates to an apparatus to automatically activate and apply the brakes on such railway vehicle without requiring an operator to manually wind the chain on such hand brake.

BACKGROUND OF THE INVENTION

Prior to the conception and development of the present invention, railway car hand brake mechanisms were well known in the art. They usually include a large, rotatable hand wheel disposed in a vertical plane and mounted on a shaft which, through a gear train, can rotate a chain drum to wind up a chain that is secured at its end remote from the chain drum to the brake rigging of the railway car. As the hand wheel is rotated in one direction, the brakes are applied and rotation of the hand wheel shaft in the opposite direction is prevented by a pawl which engages a detent wheel on the hand wheel shaft.

The brakes may be released by disengaging the pawl from the detent wheel but this causes rapid rotation of the hand wheel and the gears of the gear train. To avoid rapid rotation of the hand wheel, hand brake mechanisms have been devised which are known as "quick release" mechanisms. Generally these quick release mechanisms include a releasable connecting means between the hand wheel shaft and the gear train. When the connecting means is released, the gears of the gear train rotate rapidly, without constraint by the pawl and detent wheel, but the hand wheel remains stationary.

The Association of American Railroads (AAR) promulgates specifications for the design and operation of railway car hand brake mechanisms. Vertical wheel, gear train, hand brake mechanisms are classified in three categories, namely:

(1) Standard power—provides an average force on the chain of 3350 lbs. with a 125 lb. turning force applied to the rim of a wheel twenty-two inches in diameter.

(2) Intermediate power—provides an average force on the chain of 4475 lbs. with a 125 lb. turning force applied to the rim of a wheel twenty-two inches in diameter.

(3) High power—provides an average force on the chain of 6800 lbs. with a 125 lb. turning force applied to the rim of a wheel twenty-two inches in diameter.

After setting of the brakes, when the hand brake mechanism is released the gears of the gear train rotate rapidly. This results in the gears and other components being subjected to high forces and to shock, particularly, when the chain becomes fully let-out from the chain drum.

In recent times, the AAR has added a life cycle test to its specifications, and hand brake mechanisms which do not meet the life cycle test cannot be sold for use on railway cars operated in interchange service on United States railroads. The AAR life cycle test for quick release brakes requires that such latter brakes withstand 3000 quick release operations.

To meet such life cycle test requirements, even standard power hand brake mechanisms had to be modified when the life cycle test was adopted. When intermediate power hand brake mechanisms of the type sold prior to the adoption of the life cycle test were subjected to the life cycle test, it was found that the components thereof wore prematurely or were damaged, and it was found to be necessary to add a shock retarder, or absorber, external to the hand brake mechanism, to overcome such wear and damage. Of course, such an external shock retarder is undesirable not only because it is external to the hand brake mechanism but also because of the additional cost and because it requires field modification of the equipment on a railway car if the intermediate power hand brake mechanism is used to replace a standard power hand brake mechanism.

High power hand brake mechanisms sold prior to the adoption of the life cycle test were similarly unable to pass the life cycle test. It should be borne in mind that such high power brake mechanisms normally have additional gears to provide the desired force on the chain, and this results in a higher speed of rotation of at least some of the gears during release of the hand brake mechanism.

Although the use of an external shock retarder might have solved the problems with the higher power hand brake mechanism, a change in the AAR specifications would have been required to permit the use of such an external shock retarder. Attempts were made to redesign the high power hand brake mechanism, such as by making it stronger, so that it would meet the life cycle test without the use of an external shock retarder, but the attempts were not successful.

One of the characteristics of railway car brakes with which the invention is concerned is that the force applied to the chain, and hence, the parts of the hand brake, is non-linear and depends on the extent to which the brakes are applied or released. Thus, as the brakes are applied, relatively little force is required to take up the slack in the chain and the brake rigging, but to meet AAR requirements, the final force on the chain must be as set forth hereinbefore, namely, 3350 lbs. for a standard power brake, 4475 lbs. for an intermediate power brake and 6800 lbs. for a high power brake. After slack in the rigging is taken up, which may require, for example, 5–15 inches of chain travel, the force on the chain increases exponentially, e.g. from 200 lbs. to the final value, as the brake hand wheel is further turned to set the brakes. In reaching the final value after the slack is taken up, the chain may travel only two or three inches. Similarly, when the hand brake is released, the chain force decreases exponentially and reaches a relatively small value shortly after the hand brake is released.

As can be seen from the above-discussion, it would be advantageous to have an automatic application apparatus for applying the hand brake and thereby reduce the force required to apply the brakes.

SUMMARY OF THE INVENTION

According to a first aspect, the present invention is predicated upon the use of an apparatus that is engageable with a hand brake assembly which will automatically apply at least one brake means secured to a railway vehicle with such hand brake assembly. The apparatus consisting of an operating means having at least a portion thereof engageable with at least one gear of a gear assembly disposed in a housing member of the hand brake assembly for operating such gear assembly in a direction prompting an application of such brake means. A source of fluid pressure is connected to the operating means for periodically supplying a predetermined pressure to such operating means which is at least sufficient to cause such application of the brake means. A means is connected to the source of fluid pressure for initiating the supply of such predetermined pressure to the operating means thereby causing an automatic application of such brake means by the hand brake assembly.

According to a second aspect, the present invention provides an apparatus engageable with a hand brake assembly for automatically applying at least one brake means secured to a railway vehicle with the hand brake assembly. An operating means is provided which has at least a portion thereof engageable with at least one gear of a gear assembly disposed in a housing member of such hand brake assembly for operating such gear assembly in a direction which will cause an application of the at least one brake means. A source of fluid pressure is connected to such operating means for periodically supplying a predetermined pressure to the operating means that is at least sufficient to cause such application of the at least one brake means. A means, connected to such source of fluid pressure, is provided to initiate the supply of such predetermined pressure to the operating means thereby causing an automatic application of such brake means by the hand brake assembly. A timing means is connected intermediate such operating means and such source of fluid pressure for controlling the predetermined pressure being periodically supplied to the operating means. An overload protection means is connected to one of such source of fluid pressure and such operating means for preventing an overload on the brake means.

A third aspect of the present invention provides an apparatus engageable with a hand brake assembly for automatically applying at least one brake means secured to a railway vehicle with such hand brake assembly. Such apparatus consisting of a motor means having a rotatable shaft which carries a gear member thereon. The gear member being engageable with at least one gear of a gear assembly disposed in a housing member of such hand brake assembly for operating the gear assembly in a direction which will cause an application of such brake means. The apparatus further including a means connected to such motor for starting the motor and thereby initiating an automatic application of such brake means by the hand brake assembly.

OBJECTS OF THE INVENTION

It is, therefore, a primary object of the present invention to provide an apparatus engageable with a hand brake assembly which automatically activates and applies the brakes on a railway vehicle.

Another object of the present invention is to provide an apparatus engageable with a hand brake assembly which automatically activates and applies the brakes on a railway vehicle which eliminates the need of an operator to manually wind the chain on such hand brake.

Yet another object of the present invention is to provide an apparatus engageable with a hand brake assembly which will significantly reduce the time and effort required by an operator to apply such hand brake by virtue of the fact that the means used to initiate an application of the hand brake is rather simple and relatively easy to use.

Still another object of the present invention is to provide an apparatus engageable with a hand brake assembly which enables the apparatus to be used by an operator of basically any physical size or stature.

A further object of the present invention is to provide an apparatus engageable with a hand brake assembly that is safer to use by an operator by eliminating the need to manually wind the chain on such hand brake that could cause unnecessary physical strain on the operator thus greatly reducing the chance for injury.

An even further object of the present invention is to provide an apparatus engageable with a hand brake assembly on a railway vehicle which will provide the necessary torque to set such hand brake properly.

A still further object of the present invention is to provide an apparatus engageable with a hand brake assembly on a railway vehicle which will substantially minimize the possibility of an operator improperly setting the hand brake by not applying enough torque thereby leaving such railway vehicle somewhat free to cause serious damage and/or possible injury to railroad personnel or, on the other hand, applying too much torque thereby possibly damaging the brake rigging of such hand brake.

An additional object of the present invention is to provide an automatic application hand brake for a railway car which can be powered by a motor, such as, an electric motor, a pneumatic motor, or a hydraulic motor.

In addition to the several objects and advantages of the present invention generally described above, various other objects and advantages of the invention will become much more readily apparent to those persons who are skilled in the relevant art from the following more detailed description, particularly, when such detailed description is taken in conjunction with the attached drawing figures and the claims appended hereto.

Figure 1:
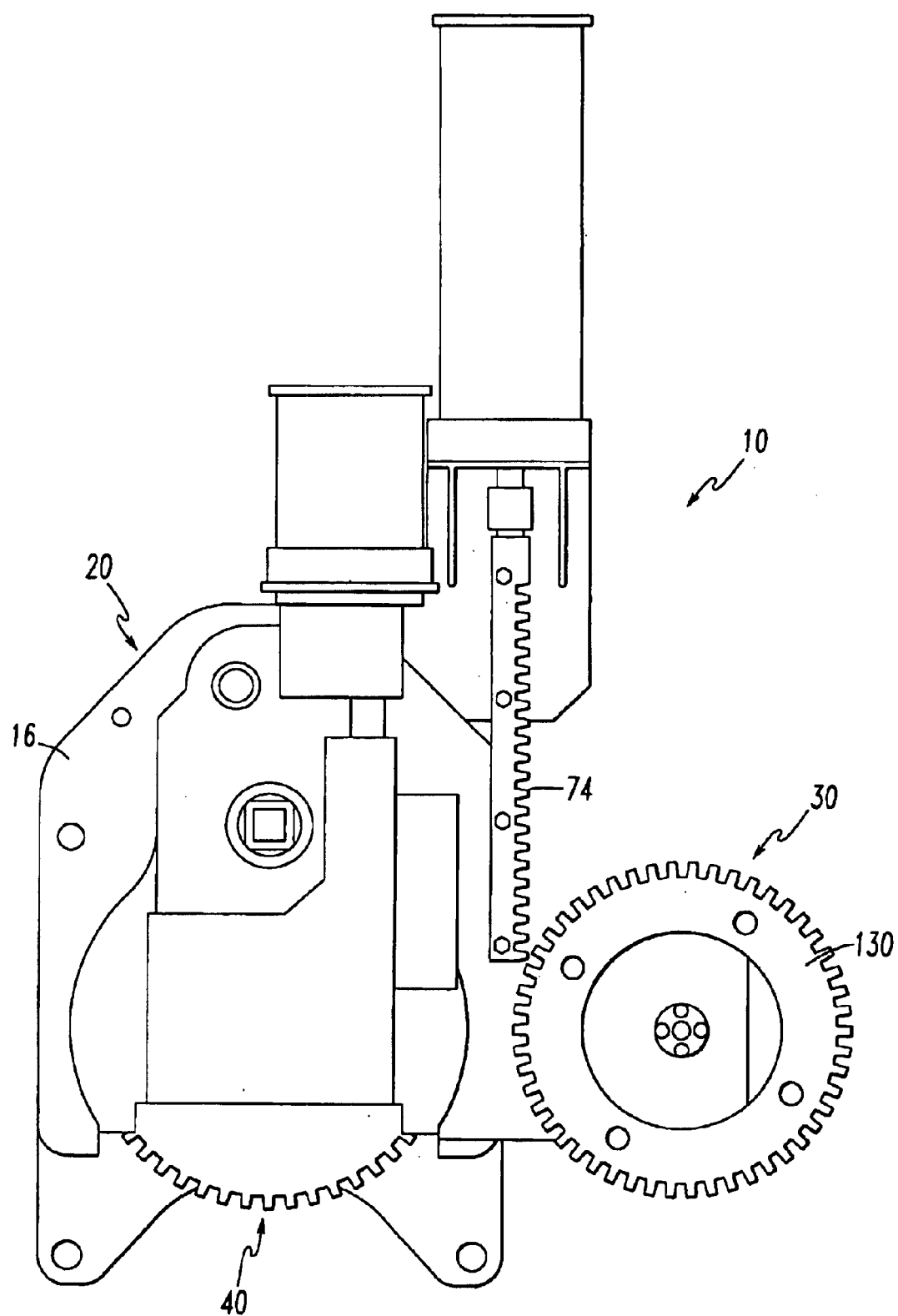
FIG. 1 is a front elevation view of a hand brake assembly incorporating a portion of a presently preferred embodiment of the automatic application hand brake of the invention.
Figure 2:
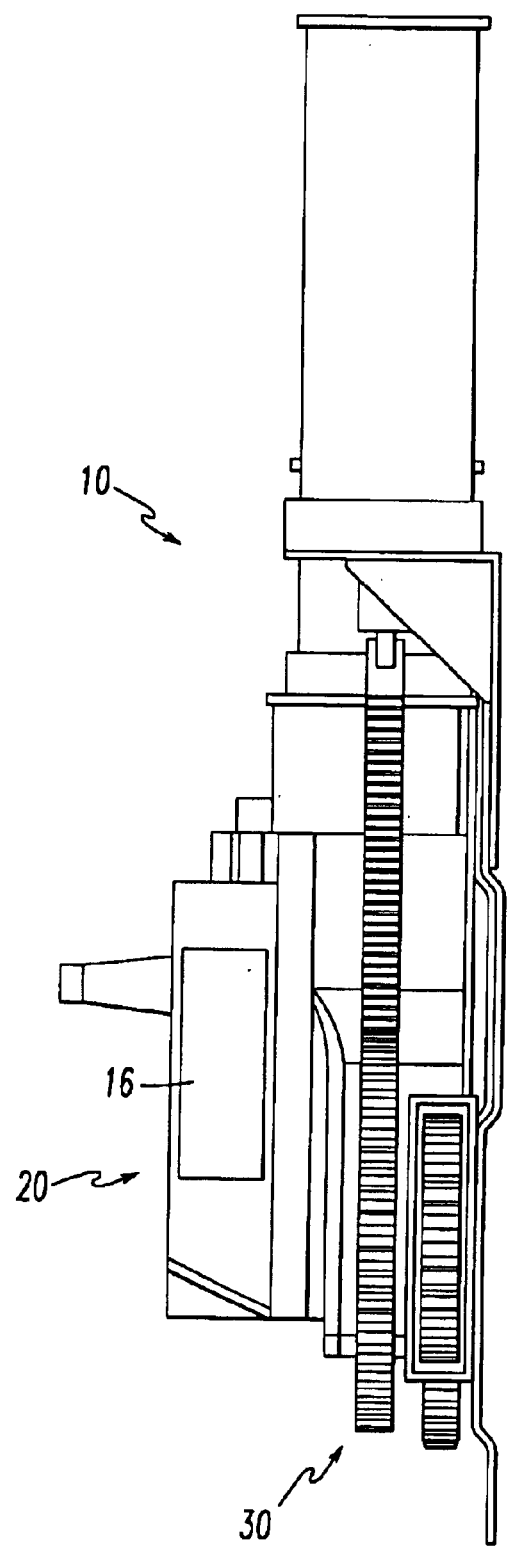
FIG. 2 is a side elevation view of the hand brake assembly illustrated in FIG. 1.
Figure 3:
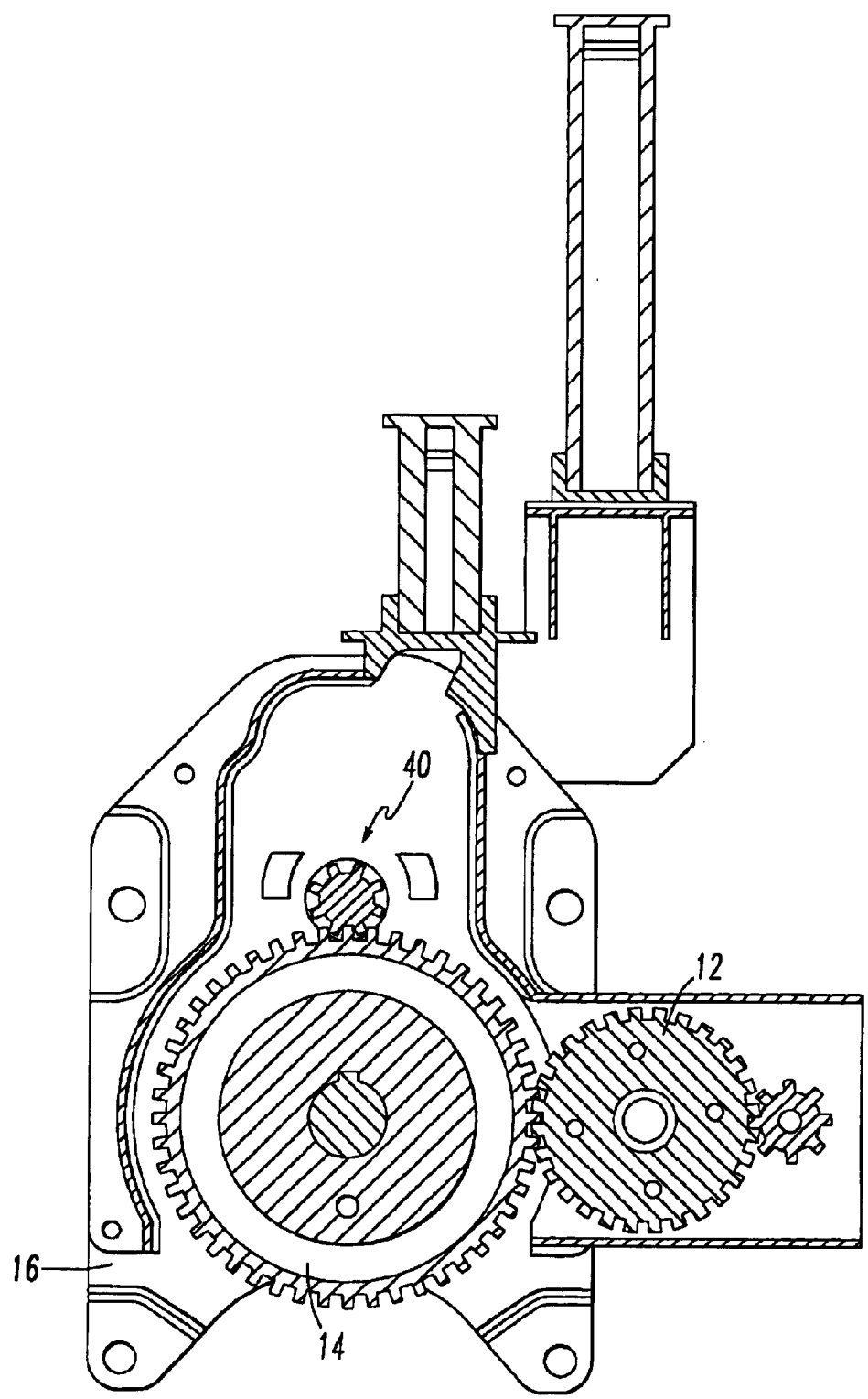
FIG. 3 is a front elevation view of the hand brake assembly illustrated in FIGS. 1 and 2 with the front cover removed.
Figure 4:
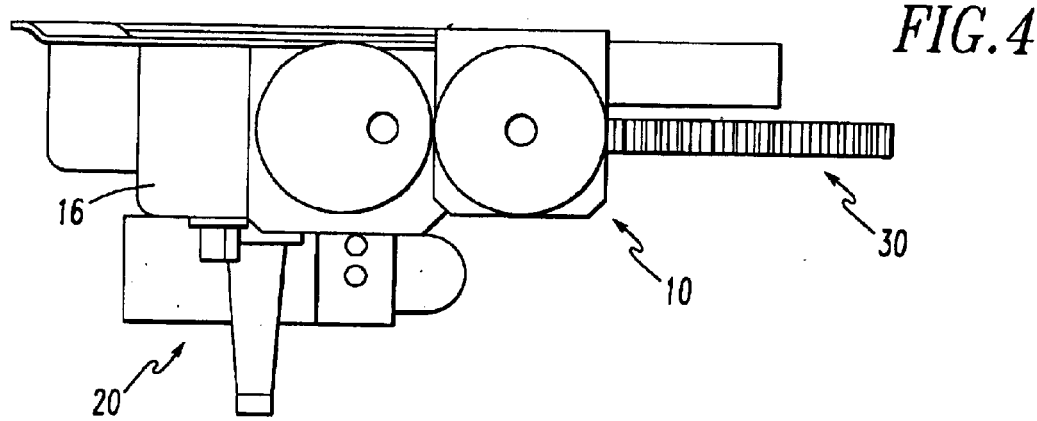
FIG. 4 is a top view of the hand brake assembly illustrated in FIGS. 1–3.
Figure 5:
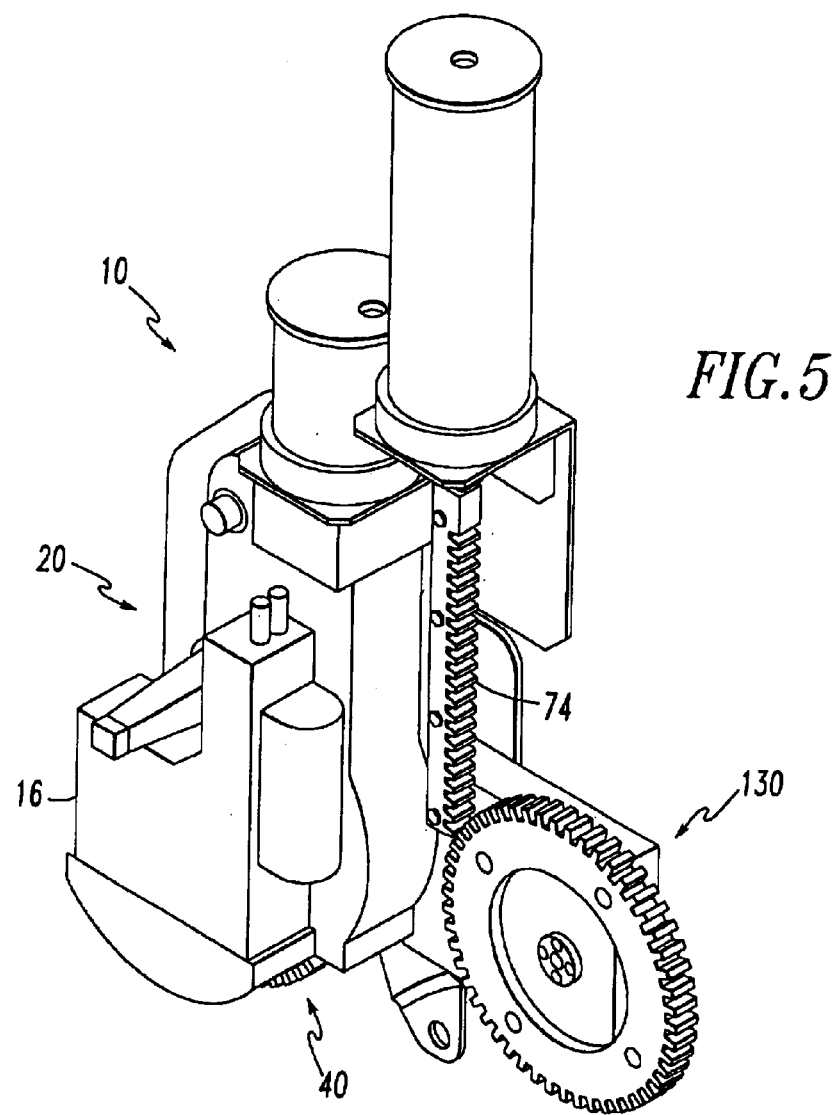
FIG. 5 is a perspective view of the hand brake assembly illustrated in FIGS. 1–4.

DETAILED DESCRIPTION OF THE PRESENTLY PREFERRED AND VARIOUS ALTERNATIVE EMBODIMENTS OF THE INVENTION

Prior to proceeding to the more detailed description of the various embodiments of the present invention, for the sake of clarity and understanding of such invention, it should be noted that identical components having identical functions have been identified with identical reference numerals throughout each of the figures illustrated herein.

Refer now, more particularly, to FIGS. 1 through 6 of the drawings. Illustrated therein is an apparatus, generally designated 10, which is engageable with a hand brake assembly, generally designated 20, for automatically applying at least one brake means (not shown) secured to a railway vehicle (not shown) with such hand brake assembly 20.

Such apparatus 10 includes an operating means, generally designated 30. Operating means 30 has at least a portion thereof, i.e., gear 12, engageable with at least one gear 14 of a hand brake gear assembly, generally designated 40, disposed in a housing member 16 of such hand brake assembly 20 for operating such gear assembly 40 in a direction which will cause an application of such at least one brake means.

The apparatus 10 further includes a source of fluid pressure, generally designated 50, connected to the operating means 30 for periodically supplying a predetermined pressure to such operating means 30 that is at least sufficient to cause such application of such at least one brake means. The presently preferred fluid pressure is pneumatic.

The final essential element of the apparatus 10 is a means, generally designated 60, which is connected to the source of fluid pressure, preferably a reservoir 18, for initiating the supply of such predetermined pressure to the operating means 30, thereby causing an automatic application of such at least one brake means by such hand brake assembly 20.

According to one presently preferred embodiment of the invention, such apparatus 10 will further include a timing means, generally designated 70. Such timing means 70 is connected intermediate such operating means 30 and the source of fluid pressure 50 for controlling such predetermined pressure being periodically supplied to the operating means 30. Timing means 70 preferably includes a choke 21 and a reservoir 22.

In such presently preferred embodiment, apparatus 10 further includes an overload protection means, generally designated 80. Such overload protection means 80 has a first portion 24 thereof that is connected to such source of fluid pressure 50 and a second portion 26 thereof that is connected to the operating means 30 for preventing an overload on such at least one brake means.

Figure 6:
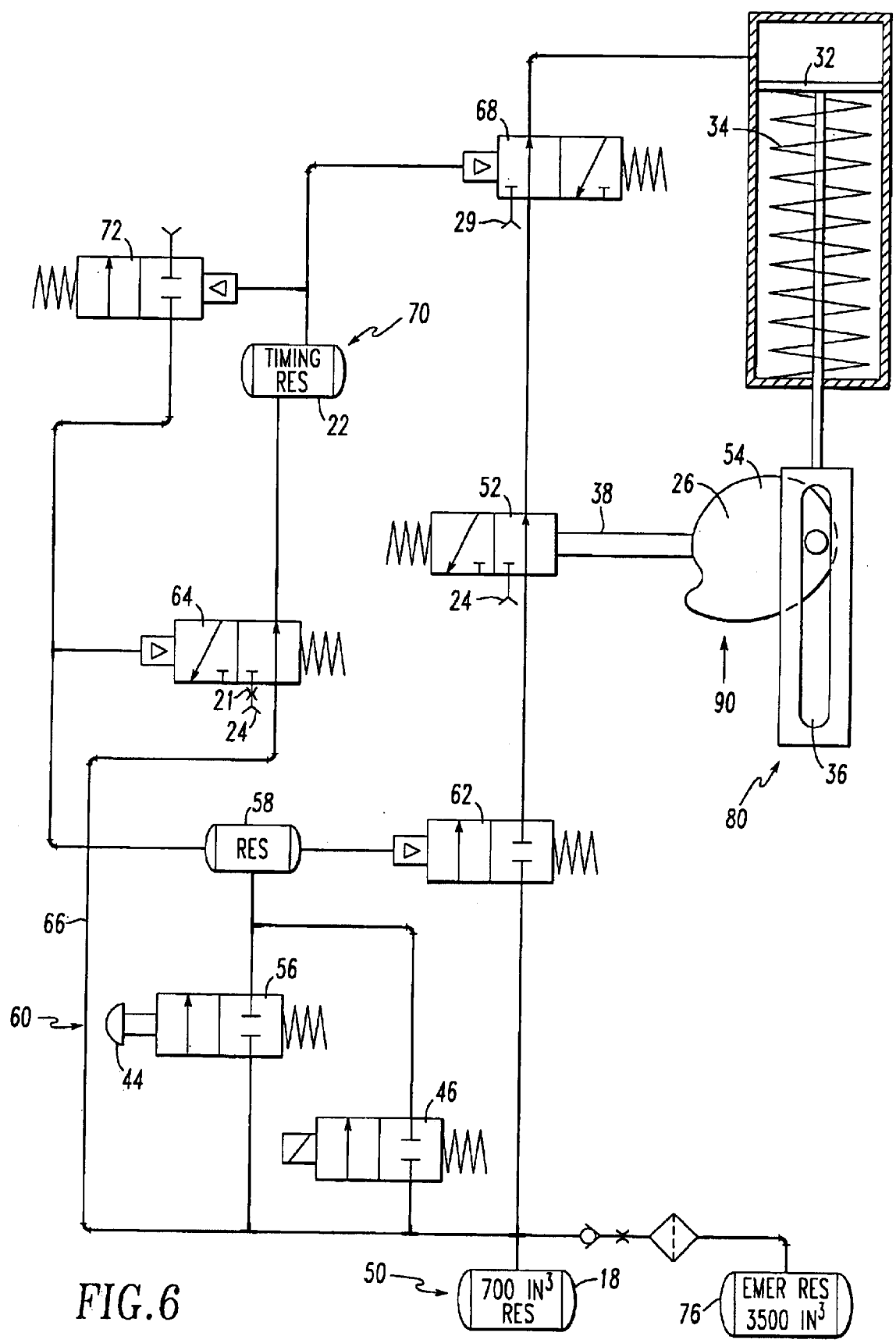
FIG. 6 is a schematic illustration of a presently preferred operating mechanism including an activation means for use with the hand brake assembly illustrated in FIGS. 1–5.
Figure 7:
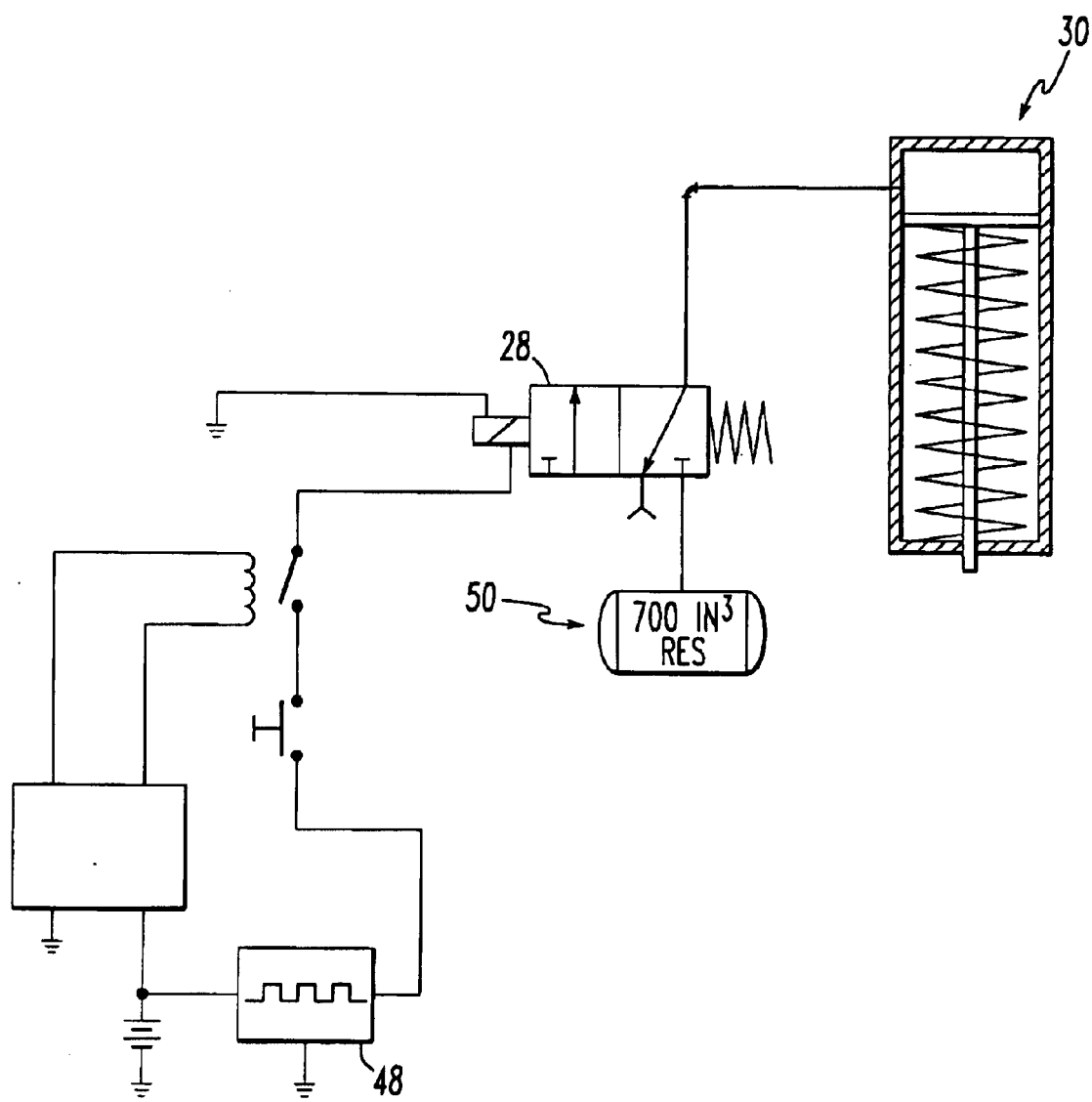
FIG. 7 is a schematic illustration of an alternative embodiment of an operating mechanism including an activation means for use with the hand brake assembly illustrated in FIGS. 1–5.
Figure 8:
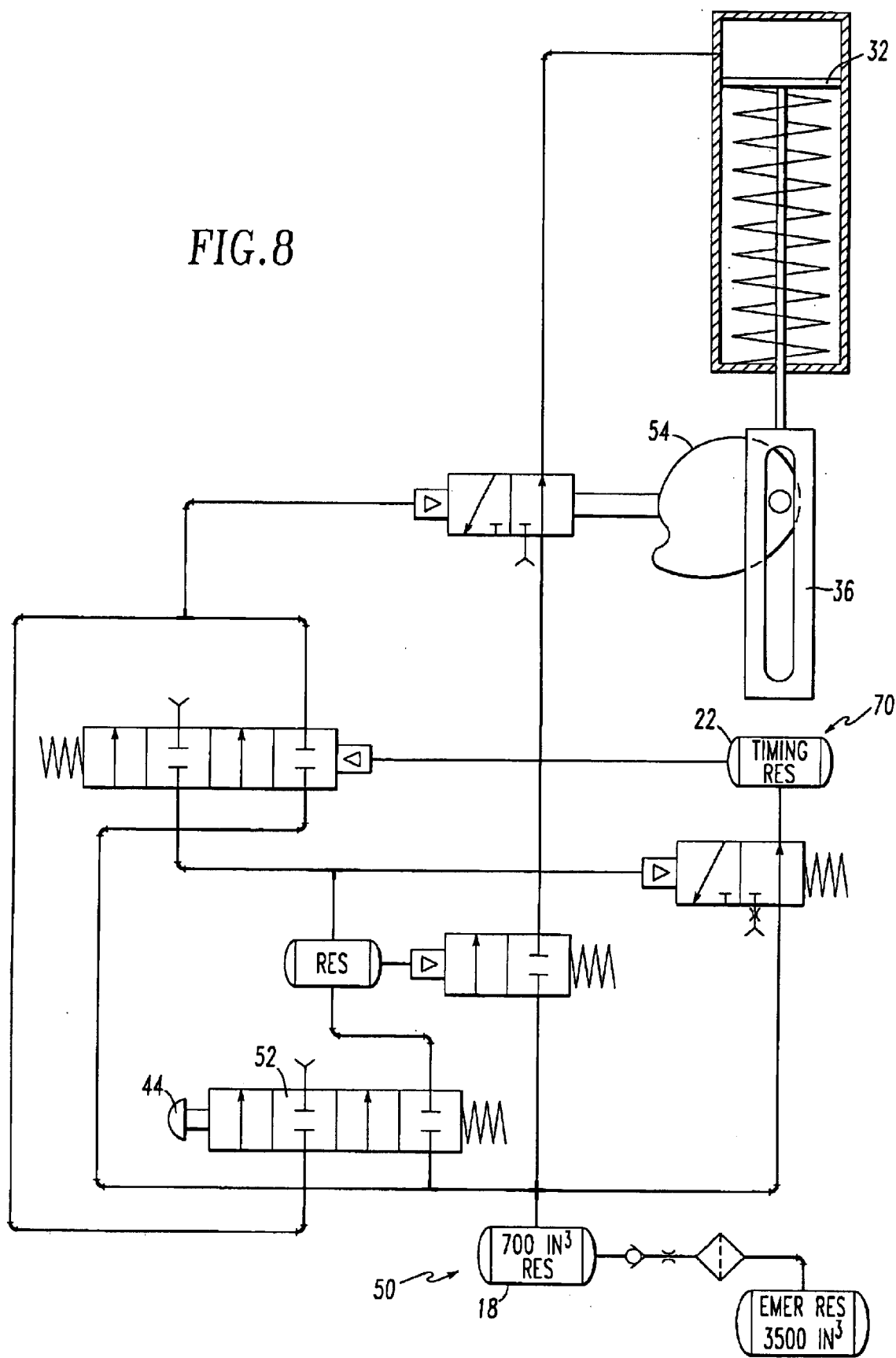
FIG. 8 is a schematic illustration of another alternative embodiment of an operating mechanism including an activation means for use with the hand brake assembly illustrated in FIGS. 1–5.
Figure 9:
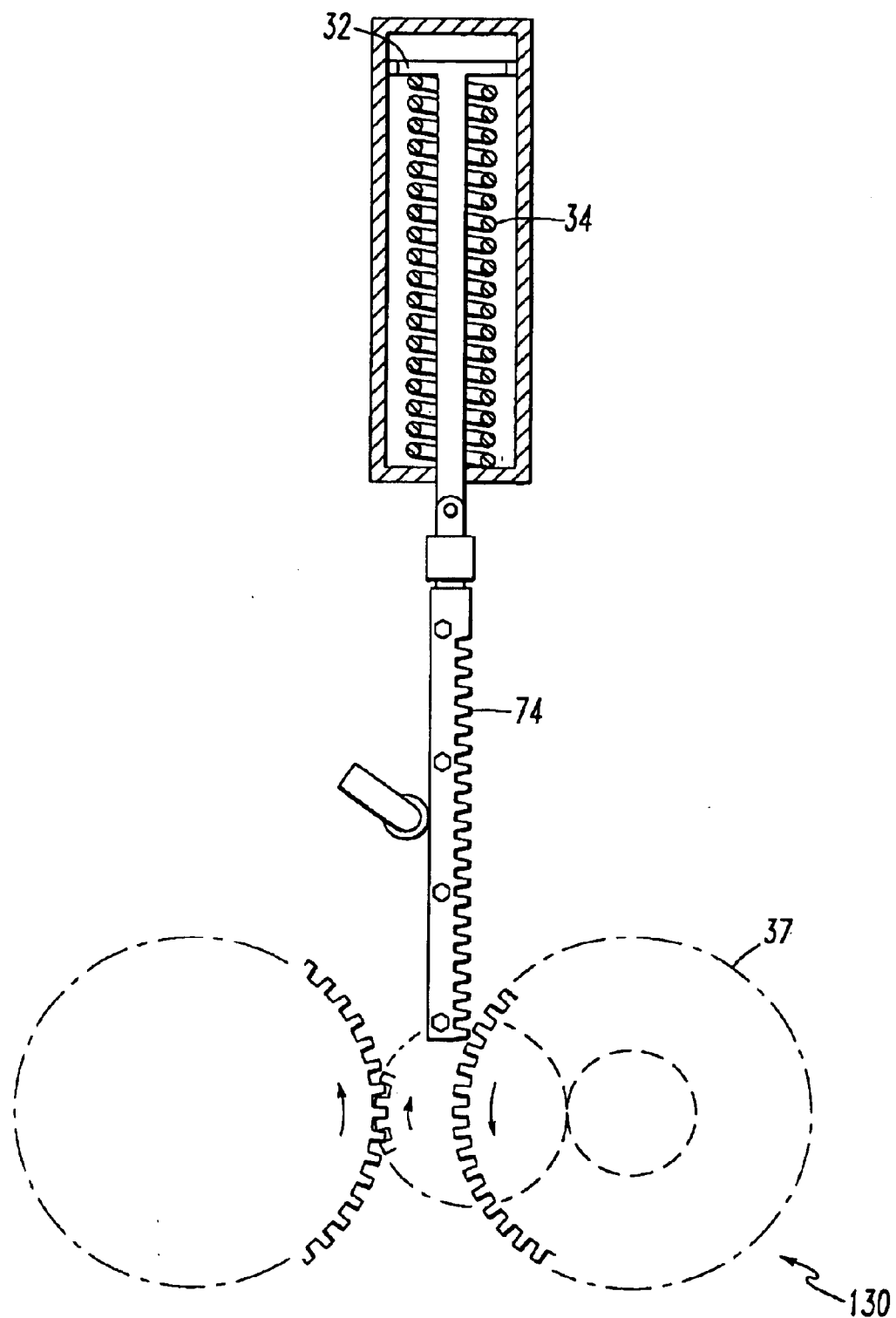
FIG. 9 is a side elevation view partially in cross section of a presently preferred embodiment of a cylinder portion of the operating mechanism operably connected to a rack assembly engageable with a gear portion of such operating mechanism for use with the hand brake assembly illustrated in FIGS. 1–5.

As shown in FIG. 7, such operating means 30 includes at least one valve means 28 for connecting the source of fluid pressure 50 to such operating means 30. However, as can be clearly seen in FIGS. 6 and 8, the operating means 30 may include a plurality of such valve means for connecting the source of fluid pressure 50 to such operating means 30. The valve means for these embodiments will be explained in further detail hereinafter.

In each of the presently preferred embodiments of the invention, the first portion 24 of the overload protection means 80 that is connected to such source of fluid pressure 50 acts as a means for venting fluid pressure from the plurality of valve means and such at least one valve means 28.

Additionally, in these embodiments such operating means 30 includes a piston member 32 connected to the source of fluid pressure 50. Such piston member 32 responding in a first direction in response to such fluid pressure and in an opposed second direction by means of a spring 34.

Preferably, the apparatus 10 further includes a valve shifting means, generally designated 90. A first portion 36 of the valve shifting means 90 is connected to such piston member 32 and a second portion 38 of such valve shifting means 90 is connected to valve 52 of such plurality of valve means.

The presently preferred means 60 for initiating the supply of such predetermined pressure to the operating means 30 is one of a push button 44 and a signal communicated to the means 60 for initiating such supply of predetermined pressure. The signal that is communicated to the means 60 for initiating such supply of predetermined pressure will be received, for example, by a solenoid valve 46. The most preferred means 60 for initiating the supply of predetermined pressure to the operating means 30 is push button 44.

It should be recognized that when the means 60 for initiating the supply of predetermined pressure to the operating means 30 is a signal communicated to such operating means 30 it may be either a radio frequency signal or, preferably, an electrical signal.

In the embodiment of the invention illustrated in FIG. 7, the overload protection means 80 will preferably include a pressure regulating means 48. The apparatus 10 may further include a slip clutch, generally designated 130, connected to such operating means 30 to provide such overload protection means 80 for the operating means 30.

According to the most preferred embodiment of the present invention such apparatus 10, which is engageable with hand brake assembly 20, includes an operating means 30. At least one gear 12 of operating means 30 is engageable with at least one gear 14 of a gear assembly 40 which is disposed in a housing member 16 of such hand brake assembly 20 for operating such gear assembly 40 in a direction which will prompt an application of such at least one brake means (not shown).

The apparatus 10 also includes a source of fluid pressure 50 connected to the operating means 30 for periodically supplying a predetermined pressure to such operating means 30 that is at least sufficient to cause the application of the brake means. The presently preferred fluid pressure is pneumatic.

Another element of the apparatus 10 is a means 60 which is connected to the source of fluid pressure for initiating the supply of such predetermined pressure to the operating means 30, thereby causing an automatic application of such at least one brake means by the hand brake assembly 20.

Such apparatus 10 will further include a timing means 70 which is connected intermediate such operating means 30 and the source of fluid pressure 50 for controlling such predetermined pressure being periodically supplied to the operating means 30. Such timing means includes choke 21 and reservoir 22.

The final element of the apparatus 10, in the most preferred embodiment, will include an overload protection means 80. Such overload protection means 80, preferably, has a first portion 24 thereof that is connected to such source of fluid pressure 50 and a second portion 26 thereof that is connected to the operating means 30 for preventing an overload on such brake means.

Figure 10:
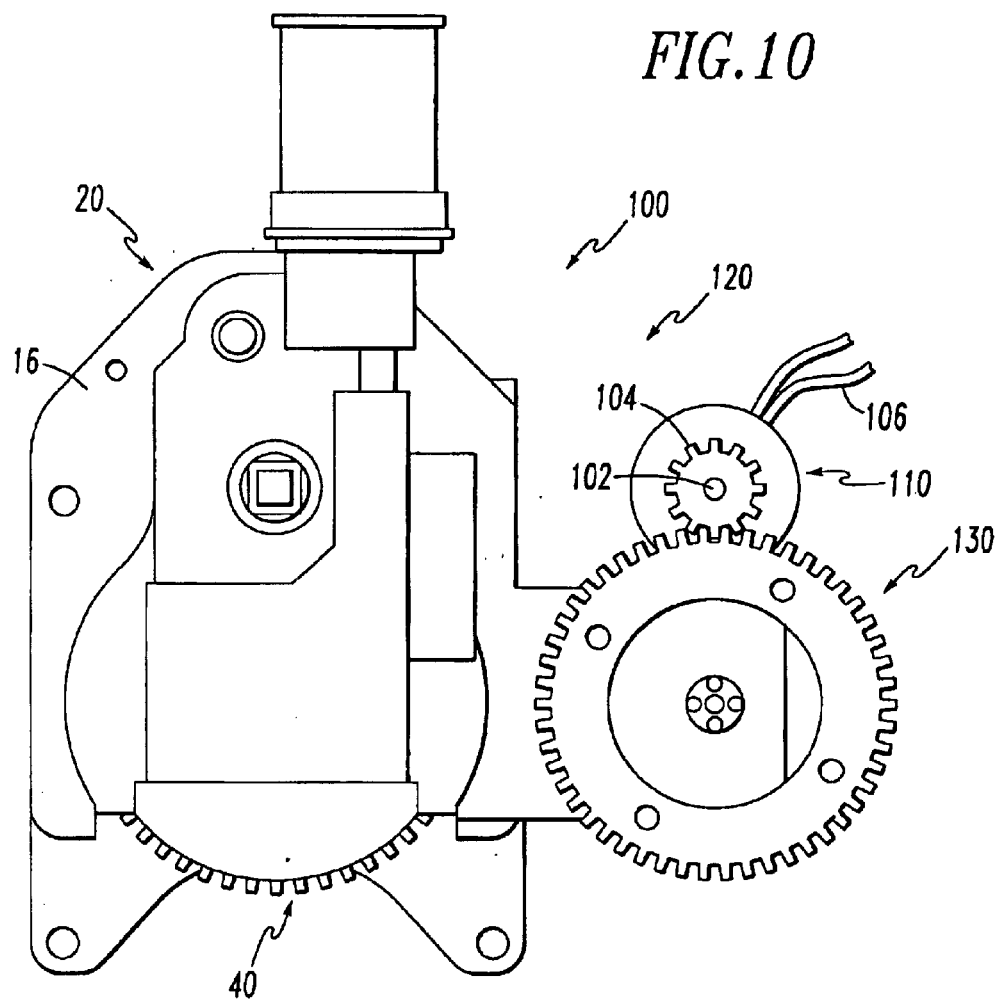
FIG. 10 is a front elevation view of a hand brake assembly which incorporates another alternative embodiment of the automatic application hand brake of the invention.
Figure 11:
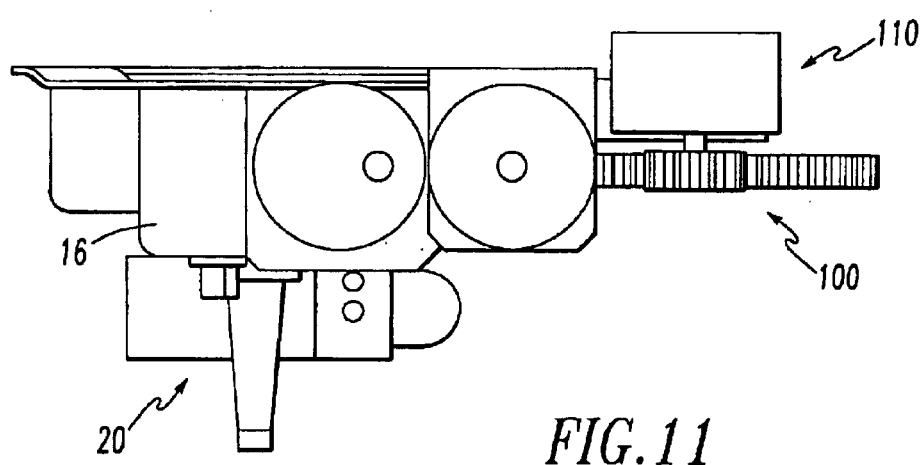
FIG. 11 is a top view of the hand brake assembly illustrated in FIG. 10.
Figure 12:
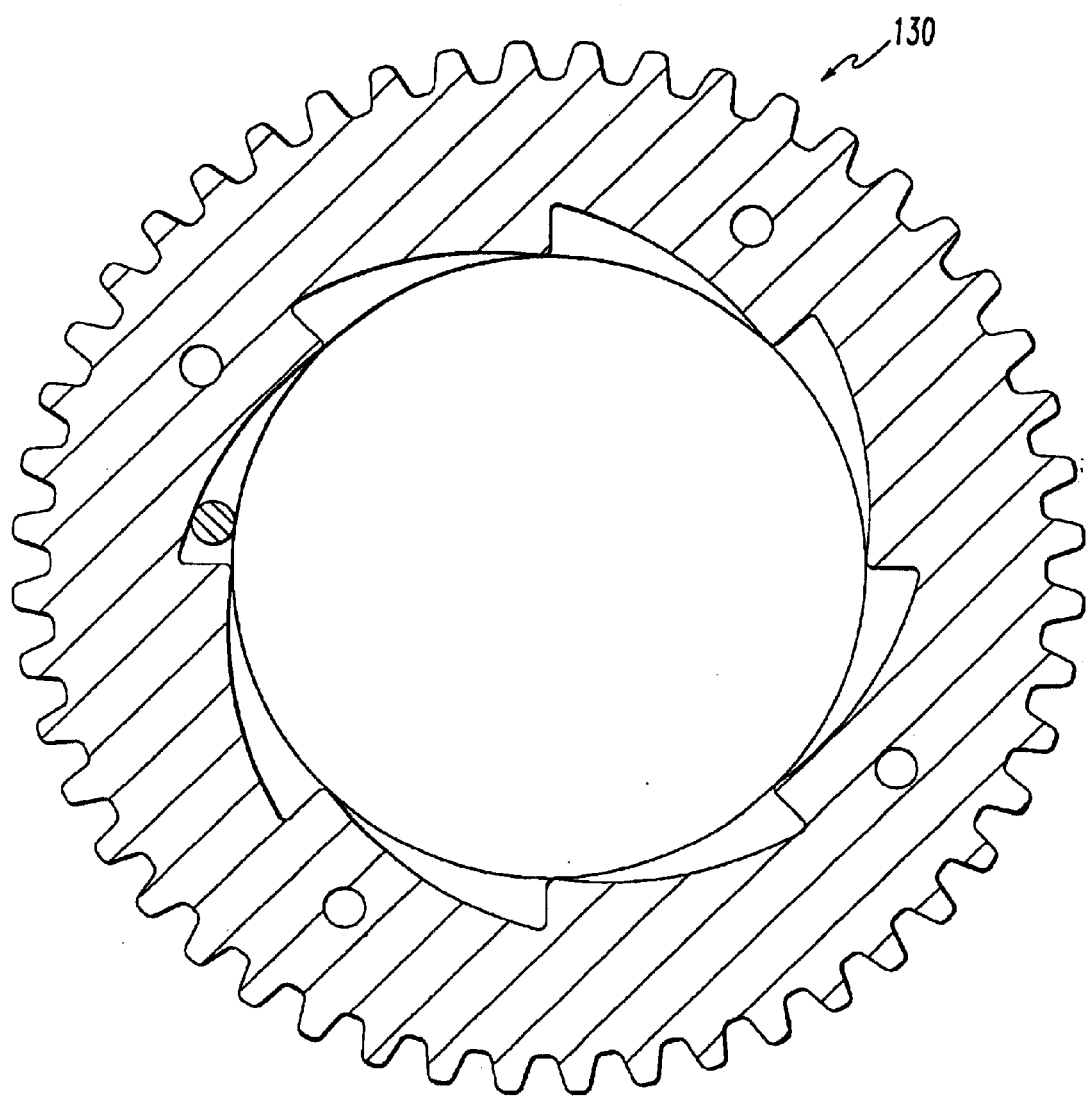
FIG. 12 is an exploded view of the slip clutch mechanism of the various embodiments of the invention.
Figure 13:
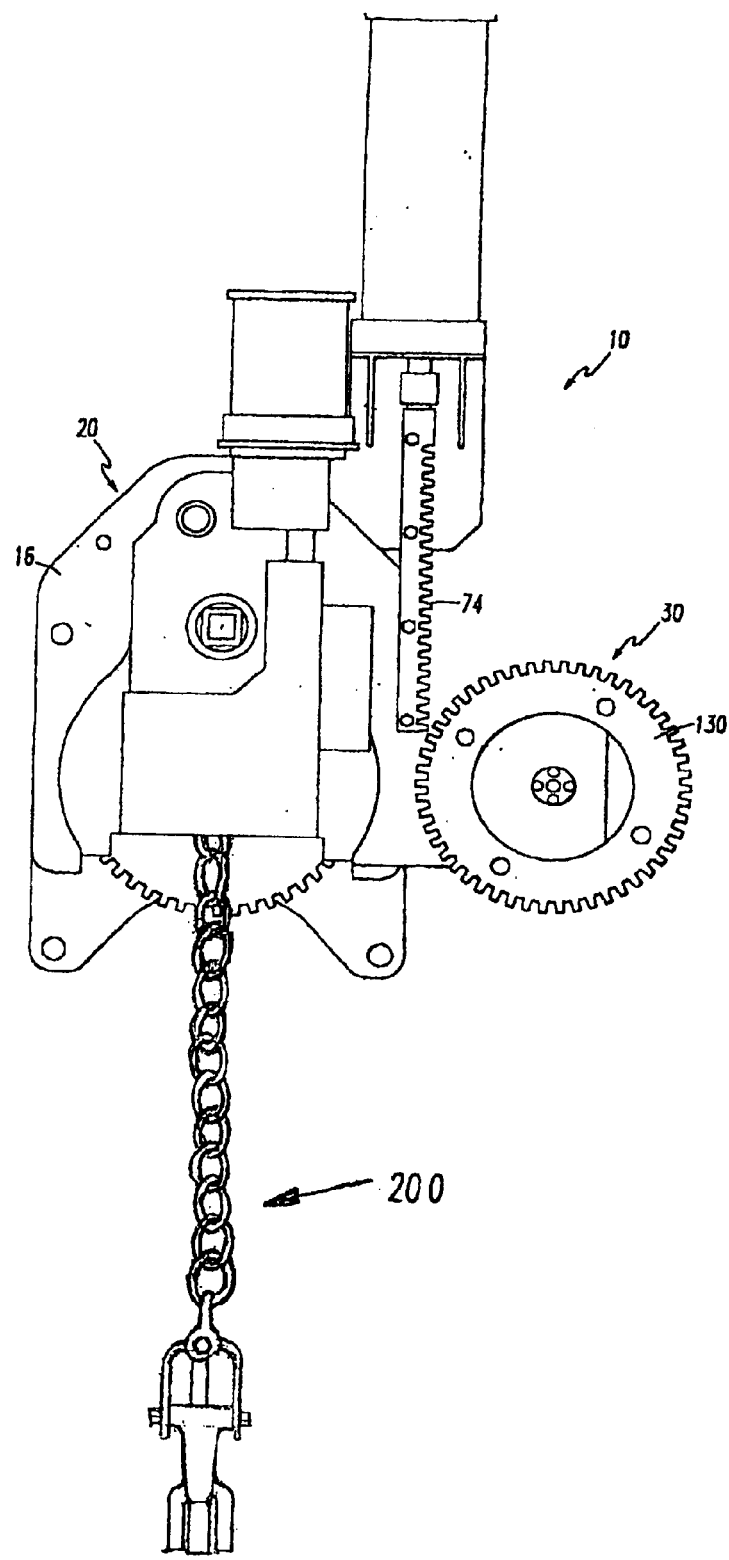
FIG. 13 is a front elevation view showing the hand brake mechanism of the present invention connected to the brake system via a chain.

Refer now, more particularly, to FIGS. 10 and 11. Illustrated therein is an apparatus, generally designated 100, engageable with a hand brake assembly 20 for an automatic application of at least one brake means secured to a railway vehicle with such hand brake assembly 20. The apparatus 100 includes a motor means, generally designated 110, having a rotatable shaft 102 which carries a gear member 104 thereon. Such gear member 104 is engageable with at least one gear 14 of a gear assembly 40 disposed in a housing member 16 of the hand brake assembly 20 for operating such gear assembly 40 in a direction which causes an application of the brake means. The apparatus 100 also includes a means, generally designated 120, connected to such motor 110 for starting the motor and thereby initiating an automatic application of such brake means by the hand brake assembly 20. Such means 120 for starting the motor 110 may be, for example, electrical wires 106.

As can be seen from the above discussion, the apparatus 10, of the present invention, provides a device that will enable an automatic application of a hand brake even in the event of a loss of an electrical signal. In this case, the hand brake can be push button applied rather than use of electronic braking. Electronic braking provides the advantage that all the brakes can be applied from the locomotive with proper controls. On the other hand, if you lose the electronic system, the push button can still initiate the hand brake. This would be a case where you would have a parallel system, i.e., push button and electronic. In the instant invention you can utilize them in parallel with each other without a problem. Additionally, with the electronic system it is possible to select certain hand brakes to be applied as a function of programming. If it is desired, you could set one hand brake on every ten cars down the train, for example. In essence, the present invention provides a system which can be designed as three distinct schemes. One pneumatic, one electronic and a combination of both pneumatic and electronic.

In the embodiments of the invention described above, it is expected that the capacity of the reservoir 18 should generally be in the range of between about 400 cubic inches and about 1,400 cubic inches. Preferably, such reservoir 18 will have a capacity of between about 400 cubic inches and above 700 cubic inches. It may be possible to use a smaller reservoir 18 because it is relatively easy to work valve 52 initially and the cam system 54 is going to increase the system efficiency, therefore, it will not require as much air in such reservoir 18. In other words, 700 cubic inches may be the worst case scenario based on the assumption that a 90 psi system is being used and the total amount of energy applied assumes every stroke of the cylinder went to full pressure in each stroke. Obviously, when one starts winding the chain (not shown) one will not need full pressure on the cylinder because it's going to be easy to wind up. Therefore, the cam 54 is going to cause it to reciprocate and return without reaching full pressure so it should not require a significant amount of air pressure.

For example, assume one has a charged reservoir 18 and everything is settling into a steady state where the cylinder piston 32 is completely returned by it's spring 34. Consequently, there is no air pressure behind the piston 32, and to start an application all that is required is to push the push button 44 attached to valve member 56 which begins the whole process. It allows air into reservoir 58. Reservoir 58 may or may not be a physical reservoir in the circuit. It could be, for example, a volume of the pipe. In any case, it allows air to pass from reservoir 18 into reservoir 58 which then operates (2) pilot operator valves 62 and 64. This moves valve 62 into the connected position and valve 64 is moved to a vented position. There is a direct connection 66 from the 700 cubic inch reservoir 18 which passes through the valve 64 to the timing reservoir 22. In this manner, the timing reservoir 22 is charged prior to starting. There are two power operated valves 68 and 72 which are shifted. Valve 72 is in the closed position to start with and valve 68 is in the connected position.

Just for explanation purposes only, pressure limits will be provided where these valves are going to drop out based on spring loads in the valves and based on the pressure of the timing reservoir 22.

As is evident, the system is designed to cause the piston 32 to reciprocate when the push button 44 is pushed in order to wind up the brake. After some amount of time, the piston 32 is required to completely return. Because it has to completely disengage, the rack 74 attached to piston 32 has to completely disengage from the gear 37 in order to perform all the manual functions of the hand brake accurately. The final operation requires the piston 32 to return all the way back to its initial position in order to clear the rack 74 from gear 37. This is accomplished through the timing means 70. For example, say there is an 18 inch chain, there will be so many strokes of the piston 32 required within a certain period of time. When that time is reached, say around 45 seconds to a minute, the piston 32 is going to stroke. The piston 32 will reciprocate about 26 times to do a full application on a standard 9300 type hand brake. However if it's a 4493 type hand brake, or 40 inch take up, it will take several additional strokes, or a longer cylinder, or a longer rack and it will require more air.

With the reservoirs 18 and 22 charged and with the piston 32 in the starting position and utilizing a system having 90 psi and a 700 cubic inch reservoir 22, when the push button 44 is pushed, connection to valve member 56 is established. This charges reservoir 58 which, in turn, shifts valves 62 and 64. Valve 64 connects timing reservoir 22 to a vented choke 21.

With push button 44 activated, valve 56 connects the 700 cubic inch reservoir 18 to reservoir 58 which causes valves 62 and 64 to shift. Now valve 64 starts reducing the pressure. The valve member 62 connects the 700 cubic inch reservoir 18 through to valve member 52. Valve member 52 is hooked to the reciprocating cam 54. When the piston 32 is in the home position it will be connected as shown in FIG. 6, which means it's passing through the valve 68. Since there is pressure in the timing reservoir 22, the valve 68 will, also, be shifted to the right hand side and connected behind the piston 32. Now there is a complete path with the reservoir 18 through valve 62 and through valve 52 and through valve 68 to the back side of the piston 32. With air flowing through the back side of the piston 32, the piston 32 is now driving the rack 74 down into the main drive gear 37 and causing the hand brake 20 to wind up. Once the piston 32 reaches the bottom of its stroke it's going to pick up a pin on cam 54 and the valve shifting mechanism is going to cause valve 52 to reciprocate. This will cause the valve member 52 to shift to a different position. Valve member 52 will then vent the air in the cylinder and the spring 34 is going to push the air back out of the cylinder or to atmosphere. When it gets almost to the top of its stroke, the cam 54 is going to pick-up again and shift valve 52 in the other direction, which is going to cause air to go back in the cylinder again. The apparatus 10 will continue this cycle until it gets the hand brake 20 completely wound up. It will require different amounts of air pressure in the cylinder to apply the brake at different stages of chain wind up. At the beginning of the application process it is going to be relatively easy, the pressure needed to extend the piston 32 will be rather low. The piston 32 is going to extend until it hits the cam and then the piston 32 is going to retract. The following strokes will require more and more pressure because the chain will become tighter and tighter. On the last stroke, the design of the gets almost to the top of its stroke, the cam 54 is going to pick-up again and shift valve 52 in the other direction, which is going to cause air to go back in the cylinder again. The apparatus 10 will continue this cycle until it gets the hand brake 20 completely wound up. It will require different amounts of air pressure in the cylinder to apply the brake at different stages of chain wind up. At the beginning of the application process it is going to be relatively easy, the pressure needed to extend the piston 32 will be rather low. The piston 32 is going to extend until it hits the cam and then the piston 32 is going to retract. The following strokes will require more and more pressure because the chain will become tighter and tighter. On the last stroke, the design of the system is to be no less than 40 psi starting from 90 psi, the initial condition, in a 700 cubic inch reservoir. This will ensure that with the size of the cylinder, the 40 psi will give enough input force into the rack in combination with the gear advantage. In the drawings, there is a pair of gears shown connected. Such gear advantage being achieved by a large main drive gear and a little drive gear that will provide a 4½ to 1 mechanical advantage in order to get the chain moving. So as long as there is 40 psi, a full load will be exerted on the chain.

It may be desirable to add an indicator (not shown) to show how tight the brake is set. This may be a sensor which could be used as a feedback. A sensor on the apparatus 10 could be used as a feedback to the electronic system (not shown), so that the locomotive controls can tell when the brake is anywhere between ¾ on to full on, or completely released. Preferably, a spring is provided on these valves and the pilot operated valves 68 and 72, that will cause the cylinder to go completely home, regardless of where it is set based on the spring loadings and the valves. Valves 68, 72, 64 and 62 are connected together and will be sequenced by a spring load to get the cylinder to go home. This initially happens when the spring on valve 68 is the strongest, so as the timing reservoir dies, valve 68 is going to flip over to a vented position first. Assume that the pressure in reservoir 18 goes from about 90 psi to 20 psi. At 20 psi valve 68 vents the air out of the cylinder, which retracts the piston 32 all the way home. The next highest load on the spring is going to be in valve 72, which may drop to about 18 psi, causing valve 72 to shift over. The spring is going to overcome the air pressure exerted on the pilot side and valve 72 is going to vent the circuit that drives valve 64 and valve 62.

As reservoir 58 is venting through valve 72 the next highest spring load is going to be valve 62. This load may be at about 16 psi in reservoir 58, as venting is occurring, it goes through 16 psi and the valve 62 will close off the reservoir 18 from the rest of the circuit. From valve 52 and valve 68, valve 64 is going to be the lowest spring and, therefore, it will shift back to a connected mode to start charging the timing reservoir 22. This basically completes the operation from an initial charge.

Another thing that must be considered is the case where the pneumatic circuitry is completely empty and it must start from scratch. Here the emergency reservoir 76, shown in FIG. 6, is completely empty and the circuit from the hand brake is completely empty and the system must start from a complete zero and go through the circuit. On the other hand, it may be possible to start from a medium charge, because after an application of the hand brake 20 there is still typically 40 psi left in that cylinder. Assuming an air tight system, the next time the system is charged it may only require charging the 700 cubic inch reservoir 18 from 40 psi to 90 psi or something in the middle. Once everything charges up to 90 psi the system is equalized and ready for operation.

While the presently preferred embodiment and various additional alternative embodiments for carrying out the instant invention have been set forth in detail in accordance with the Patent Act, those persons skilled in the hand brake art to which this invention pertains will recognize various alternative ways of practicing the invention without departing from the spirit and scope of the appended claims.

Accordingly, to promote the progress of science and useful arts, we secure for ourselves by Letters Patents for a limited time exclusive rights to all subject matter embraced by the following claims.

We claim:

1. A hand brake assembly engageable with a railway vehicle, said hand brake assembly comprising:
   (a) an operating means having at least a portion thereof engageable with at least one gear of a gear assembly disposed in a housing member of said hand brake assembly for operating said gear assembly in an application direction, said operating means includes at least one valve means;
   (b) a source of fluid pressure connected to said at least one valve means of said operating means for periodically supplying a predetermined pressure to said operating means at least sufficient to cause movement in such application direction of said at least one gear of said gear assembly; and
   (c) a means connected to said source of fluid pressure for initiating said supply of said predetermined pressure to said operating means thereby causing an automatic movement of said gear assembly in such application direction by said hand brake assembly.

2. A hand brake assembly, according to claim 1, wherein said hand bake assembly further includes an overload protection means connected to one of said source of fluid pressure and said operating means for preventing an overload.

3. A hand brake assembly, according to claim 2, wherein said overload protection means includes a pressure regulating means.

4. A hand brake assembly, according to claim 1, wherein said operating means includes a plurality of valve means for connecting said source of fluid pressure to said operating means.

5. A hand brake assembly, according to claim 4, wherein said hand brake assembly further includes means for venting said fluid pressure from said plurality of valve means.

6. A hand brake assembly, according to claim 5, wherein said operating means includes a piston member connected to said source of fluid pressure.

7. A hand brake assembly, according to claim 6, wherein said hand brake assembly further includes a valve shifting means, a first portion of said valve shifting means is connected to said piston member and a second portion of said valve shifting means is connected to at least one of said plurality of valve means.

8. A hand brake assembly, according to claim 1, wherein said hand brake assembly further includes means for venting said fluid pressure from said at least one valve means.

9. A hand brake assembly, according to claim 1, wherein said hand brake assembly further includes a timing means connected intermediate said operating means and said source of fluid pressure for controlling said predetermined pressure being periodically supplied to said operating means.

10. A hand brake assembly, according to claim 9, wherein said source of fluid pressure is pneumatic.

11. A hand brake assembly, according to claim 10, wherein said timing means includes a choke and a reservoir.

12. A hand brake assembly, according to claim 1, wherein said means for initiating said supply of said predetermined pressure to said operating means is one of a push button and a signal communicated to said means for initiating said supply of said predetermined pressure.

13. A hand brake assembly, according to claim 1, wherein said means for initiating said supply of said predetermined pressure to said operating means is a push button.

14. A hand brake assembly, according to claim 1, wherein said means for initiating said supply of said predetermined pressure to said operating means is a signal communicated to said means for initiating said supply of said predetermined pressure by one of a radio frequency signal and an electrical signal.

15. A hand brake assembly, according to claim 14, wherein said signal for initiating said supply of said predetermined pressure to said operating means is said electrical signal.

16. A hand brake assembly, according to claim 1, wherein said hand brake assembly further includes a slip clutch connected to said operating means to provide an overload protection means for said operating means.

* * * * *